(12) United States Patent
Sullivan

(10) Patent No.: US 7,633,551 B2
(45) Date of Patent: *Dec. 15, 2009

(54) COMPRESSED TIMING INDICATORS FOR MEDIA SAMPLES

(75) Inventor: Gary J. Sullivan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 569 days.

This patent is subject to a terminal disclaimer.

(21) Appl. No.: 11/379,025

(22) Filed: Apr. 17, 2006

(65) Prior Publication Data
US 2007/0009049 A1    Jan. 11, 2007

Related U.S. Application Data

(63) Continuation of application No. 11/029,159, filed on Jan. 4, 2005, now Pat. No. 7,242,437, which is a continuation of application No. 09/982,128, filed on Oct. 18, 2001, now abandoned.

(60) Provisional application No. 60/241,407, filed on Oct. 18, 2000.

(51) Int. Cl.
*H04N 5/06* (2006.01)
*H04N 9/475* (2006.01)
*H04N 5/91* (2006.01)

(52) U.S. Cl. ................. 348/521; 348/512; 386/65

(58) Field of Classification Search ........... 709/202, 709/203; 375/240.01, 240.28; 348/500, 348/512, 513, 518; 370/394; 386/65, 101

See application file for complete search history.

(56) References Cited

U.S. PATENT DOCUMENTS

| 4,766,504 A | | 8/1988 | Narusawa et al. |
| 4,847,877 A | | 7/1989 | Besseyre |
| 4,953,040 A | * | 8/1990 | Hedtke et al. ............. 386/65 |

(Continued)

FOREIGN PATENT DOCUMENTS

EP    0 886 398 A1    12/1998

(Continued)

OTHER PUBLICATIONS

"A Simple Multi-layer Digital Video Coder for Multimedia Network Applications" Proceedings 10th International Conference on Image Analysis and Processing Sep. 27-29, 1999 Venice italy pp. 992-996.

(Continued)

*Primary Examiner*—Wing F Chan
*Assistant Examiner*—Jonathan Willis
(74) *Attorney, Agent, or Firm*—Klarquist Sparkman, LLP

(57) ABSTRACT

A first frame of data is encoded and a first timestamp associated with the first frame of data is generated. The first timestamp includes complete timing information. The first frame of data and the associated first timestamp is transmitted to a destination. A second frame of data is encoded and a second timestamp associated with the second frame of data is generated. The second timestamp includes a portion of the complete timing information. The second frame of data and the associated second timestamp is then transmitted to the destination. Additional frames of data are encoded and additional timestamps associated with the additional frames of data are generated. The majority of the additional timestamps include a portion of the complete timing information.

17 Claims, 5 Drawing Sheets

U.S. PATENT DOCUMENTS

| | | | |
|---|---|---|---|
| 5,091,899 | A | 2/1992 | Adachi et al. |
| 5,097,364 | A | 3/1992 | Goto et al. |
| 5,430,485 | A | 7/1995 | Lankford et al. |
| 5,469,466 | A | 11/1995 | Chu |
| 5,473,385 | A | 12/1995 | Leske |
| 5,559,999 | A | 9/1996 | Maturi et al. |
| 5,565,923 | A | 10/1996 | Zdepski |
| 5,566,174 | A | 10/1996 | Sato et al. |
| 5,583,500 | A | 12/1996 | Allen et al. |
| 5,661,665 | A | 8/1997 | Glass et al. |
| 5,828,416 | A | 10/1998 | Ryan |
| 5,835,668 | A * | 11/1998 | Yanagihara ............... 386/95 |
| 5,870,444 | A | 2/1999 | Mynett et al. |
| 5,874,997 | A | 2/1999 | Haigh |
| 5,898,897 | A | 4/1999 | Son et al. |
| 5,946,043 | A | 8/1999 | Lee et al. |
| 5,955,977 | A | 9/1999 | Lei |
| 5,956,090 | A | 9/1999 | Yamauchi |
| 5,970,204 | A | 10/1999 | Higurashi |
| 6,069,902 | A | 5/2000 | Kurano et al. |
| 6,075,576 | A | 6/2000 | Tan et al. |
| 6,081,299 | A * | 6/2000 | Kesselring ............... 348/512 |
| 6,081,507 | A | 6/2000 | Chao et al. |
| 6,088,063 | A * | 7/2000 | Shiba ............... 348/515 |
| 6,112,226 | A * | 8/2000 | Weaver et al. ............ 709/203 |
| 6,219,067 | B1 | 4/2001 | Dieterich |
| 6,262,776 | B1 | 7/2001 | Griffits |
| 6,266,158 | B1 | 7/2001 | Hata et al. |
| 6,323,909 | B1 | 11/2001 | Michener et al. |
| 6,330,214 | B1 | 12/2001 | Ohta et al. |
| 6,487,361 | B2 | 11/2002 | Galt et al. |
| 6,490,405 | B1 | 12/2002 | Speed et al. |
| 6,519,411 | B1 | 2/2003 | Sugimura et al. |
| 6,522,335 | B2 | 2/2003 | Brown |
| 6,535,925 | B1 | 3/2003 | Svanbro et al. |
| 6,578,070 | B1 | 6/2003 | Weaver et al. |
| 6,646,655 | B1 | 11/2003 | Brandt et al. |
| 6,680,944 | B1 * | 1/2004 | Lym et al. ............... 370/394 |
| 6,697,569 | B1 | 2/2004 | Gomez et al. |
| 7,000,031 | B2 | 2/2006 | Fischer et al. |
| 2002/0042844 | A1 | 4/2002 | Chiazzese |
| 2002/0083020 | A1 | 6/2002 | Leon et al. |
| 2002/0083205 | A1 | 6/2002 | Leon et al. |

FOREIGN PATENT DOCUMENTS

| | | |
|---|---|---|
| EP | 0 948 214 A2 | 10/1999 |
| EP | 1 018 840 A2 | 7/2000 |
| EP | 1 043 892 A1 | 10/2000 |
| EP | 1 069 777 A1 | 1/2001 |
| EP | 1 079 631 A1 | 2/2001 |
| EP | 1 111 932 A2 | 6/2001 |
| WO | WO 99/56472 | 11/1999 |
| WO | WO 00/56077 | 9/2000 |
| WO | WO 00/64186 | 10/2000 |

OTHER PUBLICATIONS

"Multiresolution-Multicast Video Distribution over the Internet" 2000 IEEE Wireless Communications and Networking Conference Sep. 23-28, 2000 Chicago IL Part vol. 3 pp. 1457-1461.

"High performance software-only H.261 video compression on PC" Proceedings of the SPIE—The International Society for Optical Engineering vol. 2668 1996 pp. 105-110.

U.S. Appl. No. 60/241,407, filed Oct. 2000, Sullivan.

Anderson, "A Proposed Method for Creating VCR Functions Using MPEG Streams," IEEE, 1996, pp. 380-382.

Cipher Digital, Inc.; Time Code Handbook, 1990, Cipher Digital, Chapters 3 and 5.

Cipher Digital, Inc.; Time Code Handbook, 1990, Cipher Digital, pp. 15 & 22.

Cipher Digital, Inc.; Time Code Handbook, 1990, Cipher Digital, p. 42.

Grattarola et al., "A Simple Multi-layer Digital Video Coder for Multimedia Network Application," Proceedings 10th International Conference on Image Analysis and Processing, Sep. 27-29, 1999, Venice, Italy, pp. 992-996.

Kasperovich, "High Performance Software-only H.261 Video Compression on PC," Proceedings of the SPIE—The International Society for Optical Engineering, vol. 2668, 1996, pp. 105-110.

Lei, "The Construction of Efficient Variable-length Codes with Clear Synchronizing Codewords for Ditigal Video Application," SPIE vol. 1605, Visual Commuinications and Image Processing '91: Visual Communication, Nov. 11, 1991, pp. 863-873.

Stockhammer et al., "H.26L/JVT Coding Network Abstraction Layer and IP-Based Transport," Proceedings 2002 Int'l Conference on Image Processing, ICIP 2002, IEEE, Sep. 22.-Sep. 25, 2005, pp. 485, 488.

TCP-101i Time Code Processor Guide to Installation and Operation M133-9900-200, Miranda Technologies Inc., 1999, pp. i-vii; 1-47.

Vass et al., "Multiresolution-Multicast Video Distribution Over the Internet," 2000 IEEE Wireless Communications and Networking Conference, Sep. 23-28, 2000, Chicago, IL, Part vol. 3, pp. 1457-1461.

Williams, "How-to All in Good Timecode," Adobe Magazine, Spring 1999, pp. 57-59.

* cited by examiner

COMPRESSED TIMING INDICATORS FOR MEDIA SAMPLES

CROSS REFERENCE TO RELATED APPLICATIONS

This application is a continuation of U.S. patent application Ser. No. 11/029,159, filed Jan. 4, 2005 now U.S. Pat. No. 7,242,437, which is a continuation of U.S. patent application Ser. No. 09/982,128, filed Oct. 18, 2001, now abandoned which claims the benefit of U.S. Provisional Application No. 60/241,407, filed Oct. 18, 2000. All applications are incorporated herein in their entirety.

TECHNICAL FIELD

The present invention relates to video processing systems and, more particularly, to the compression of timing indicators associated with media samples.

BACKGROUND

The concept of recording and using timing information is fundamental to the needs of multimedia applications. Pictures, video, text, graphics, and sound need to be recorded with some understanding of the time associated with each sample of the media stream. This is useful for synchronizing different multimedia streams with each other, for carrying information to preserve the original timing of the media when playing a media stream, for identifying specific locations within a media stream, and for recording the time associated with the media samples to create a scientific or historical record. For example, if audio and video are recorded together but handled as separate streams of media data, then timing information is necessary to coordinate the synchronization of these two (or more) streams.

Typically, a media stream (such as a recorded audio track or recorded video or film shot) is represented as a sequence of media samples, each of which is associated (implicitly or explicitly) with timing information. A good example of this is video and motion picture film recording, which is typically created as a sequence of pictures, or frames, each of which represents the camera view for a particular short interval of time (e.g., typically ¹⁄₂₄ seconds for each frame of motion picture film). When this sequence of pictures is played back at the same number of frames per second (known as the "frame rate") as used in the recording process, an illusion of natural movement of the objects depicted in the scene can be created for the viewer.

Similarly, sound is often recorded by regularly sampling an audio waveform to create a sequence of digital samples (for example, using 48,000 samples per second) and grouping sets of these samples into processing units called frames (e.g., 64 samples per frame) for further processing such as digital compression encoding or packet-network transmission (such as Internet transmission). A receiver of the audio data will then reassemble the frames of audio that it has received, decode them, and convert the resulting sequence of digital samples back into sound using electro-acoustic technology.

FIG. 1 illustrates a conventional system 100 for processing and distributing video content. The video content is captured using a video camera 102 (or any other video capture device) that transfers the captured video content onto video tape or another storage medium. Later, the captured video content may be edited using a video editor 104. A video encoder 106 encodes the video content to reduce the storage space required for the video content or to reduce the transmission bandwidth required to transmit the video content. Various encoding techniques may be used to compress the video content, such as the MPEG-2 (Moving Picture Experts Group 2nd generation) compression format.

The encoded video content is provided to a transmitter 108, which transmits the encoded video content to one or more receivers 110 across a communication link 112. Communication link 112 may be, for example, a physical cable, a satellite link, a terrestrial broadcast, an Internet connection, a physical medium (such as a digital versatile disc (DVD)) or a combination thereof. A video decoder 114 decodes the signal received by receiver 110 using an appropriate decoding technique. The decoded video content is then displayed on a video display 116, such as a television or a computer monitor. Receiver 110 may be a separate component (such as a set top box) or may be integrated into video display 116. Similarly, video decoder 114 may be a separate component or may be integrated into the receiver 110 or the video display 116.

Proper recording and control of timing information is needed to coordinate multiple streams of media samples, such as for synchronizing video and associated audio content. Even the use of media which does not exhibit a natural progression of samples through time will often require the use of timing information in a multimedia system. For example, if a stationary picture (such as a photograph, painting, or document) is to be displayed along with some audio (such as an explanatory description of the content or history of the picture), then the timing of the display of the stationary picture (an entity which consists of only one frame or sample in time) may need to be coordinated with the timing of the associated audio track.

Other examples of the usefulness of such timing information include being able to record the date or time of day at which a photograph was taken, or being able to specify editing or viewing points within media streams (e.g., five minutes after the camera started rolling).

In each of the above cases, a sample or group of samples in time of a media stream can be identified as a frame, or fundamental processing unit. If a frame consists of more than one sample in time, then a convention can be established in which the timing information represented for a frame corresponds to the time of some reference point in the frame such as the time of the first, last or middle sample.

In some cases, a frame can be further subdivided into even smaller processing units, which can be called fields. One example of this is in the use of interlaced-scan video, in which the sampling of alternating lines in a picture are separated so that half of the lines of each picture are sampled as one field at one instant in time, and the other half of the lines of the picture are then sampled as a second field a short time later. For example, lines 1, 3, 5, etc. may be sampled as one field of picture, and then lines 0, 2, 4, etc. of the picture may be sampled as the second field a short time later (for example ¹⁄₆₀th of a second later). In such interlaced-scan video, each frame can be typically separated into two fields.

Similarly, one could view a grouping of 64 samples of an audio waveform for purposes of data compression or packet-network transmission to be a frame, and each group of eight samples within that frame to be a field. In this example, there would be eight fields in each frame, each containing eight samples.

In some methods of using sampled media streams that are well known in the art, frames or fields may consist of overlapping sets of samples or transformations of overlapping sets of samples. Two examples of this behavior are the use of lapped orthogonal transforms [1] Henrique Sarmento Malvar, *Signal Processing with Lapped Transforms*, Boston, Mass., Artech House, 1992; 2) H. S. Malvar and D. H. Staelin, "The LOT: transform coding without blocking effects," IEEE Transactions on Acoustics, Speech, and Signal Processing, vol. 37, pp. 553-559, Apr. 1989; 3) H. S. Malvar, Method and system for adapting a digitized signal processing system for block processing with minimal blocking artifacts, U.S. Pat. No. 4,754,492, June 1988.] and audio redundancy coding [1) J. C. Bolot, H. Crepin, A. Vega-Garcia: "Analysis of Audio Packet Loss in the Internet", Proceedings of the 5th International Workshop on Network and Operating System Support for Digital Audio and Video, pp. 163-174, Durham, April 1995; 2) C. Perkins, I. Kouvelas, O. Hodson, V. Hardman, M. Handley, J. C. Bolot, A. Vega-Garcia, S. Fosse-Parisis: "RTP Payload for Redundant Audio Data", Internet Engineering Task Force Request for Comments RFC2198, 1997.]. Even in such cases it is still possible to establish a convention by which a time is associated with a frame or field of samples.

In some cases, the sampling pattern will be very regular in time, such as in typical audio processing in which all samples are created at rigidly-stepped times controlled by a precise clock signal. In other cases, however, the time between adjacent samples in a sequence may differ from location to location in the sequence.

One example of such behavior is when sending audio over a packet network with packet losses, which may result in some frames not being received by the decoder while other frames should be played for use with their original relative timing. Another example of such behavior is in low-bit-rate videoconferencing, in which the number of frames sent per second is often varied depending on the amount of motion in the scene (since small changes take less data to send than large changes, and the overall channel data rate in bits per second is normally fixed).

If the underlying sampling structure is such that there is understood to be a basic frame or field processing unit sampling rate (although some processing units may be skipped), then it is useful to be able to identify a processing unit as a distinct counting unit in the time representation. If this is incorporated into the design, the occurrence of a skipped processing unit may be recognized by a missing value of the counting unit (e.g., if the processing unit count proceeds as 1, 2, 3, 4, 6, 7, 8, 9, . . . , then it is apparent that count number 5 is missing).

If the underlying sampling structure is such that the sampling is so irregular that there is no basic processing unit sampling rate, then what is needed is simply a good representation of true time for each processing unit. Normally however, in such a case there should at least be a common time clock against which the location of the processing unit can be referenced.

In either case (with regular or irregular sampling times), it is useful for a multimedia system to record and use timing information for the samples or frames or fields of each processing unit of the media content.

Different types of media may require different sampling rates. If timing information is always stored with the same precision, a certain amount of rounding error may be introduced by the method used for representing time. It is desirable for the recorded time associated with each sample to be represented precisely in the system with little or no such rounding error. For example, if a media stream operates at $30{,}000/1001$ frames per second (the typical frame rate of North American standard NTSC broadcast video—approximately 29.97 frames per second) and the precision of the time values used in the system is to one part in $10^{-6}$ seconds, then although the time values may be very precise in human terms, it may appear to processing elements within the system that the precisely-regular sample timing (e.g. $100/30{,}000$ seconds per sample) is not precisely regular (e.g. 33,366 clock increment counts between samples, followed by 33,367 increments, then 33,367 increments, and then 33,366 increments again). This can cause difficulties in determining how to properly handle the media samples in the system.

Another problem in finding a method to represent time is that the representation may "drift" with respect to true time as would be measured by a perfectly ideal "wall clock". For example, if the system uses a precisely-regular sample timing of $100/30{,}000$ seconds per sample and all samples are represented with incremental time intervals being 33,367 increments between samples, the overall time used for a long sequence of such samples will be somewhat longer than the true time interval—a total of about one frame time per day and accumulating more than five minutes of error after a year of duration.

Thus, "drift" is defined as any error in a timecode representation of sampling times that would (if uncorrected) tend to increase in magnitude as the sequence of samples progresses.

One example of a method of representing timing information is found in the SMPTE 12M design [Society of Motion Picture and Television Engineers, Recommended Practice 12M: 1999] (hereinafter called "SMPTE timecode"). SMPTE timecodes are typically used for television video data with timing specified in the United States by the National Television Standards Committee (NTSC) television transmission format, or in Europe, by the Phase Alternating Line (PAL) television transmission format.

SMPTE timecode is a synchronization signaling method originally developed for use in the television and motion picture industry to deal with video tape technology. The challenge originally faced with videotape was that there was no "frame accurate" way to synchronize devices for video or sound-track editing. A number of methods were employed in the early days, but because of the inherent slippage and stretching properties of tape, frame accurate synchronization met with limited success. The introduction of SMPTE timecode provided this frame accuracy and incorporated additional functionality. Additional sources on SMPTE include "The Time Code Handbook" by Cipher Digital Inc. which provides a complete treatment of the subject, as well as an appendix containing ANSI Standard SMPTE 12M-1986. Additionally, a text entitled "The Sound Reinforcement Handbook" by Gary Davis and Ralph Jones for Yamaha contains a section on timecode theory and applications.

The chief purpose of SMPTE timecode is to synchronize various pieces of equipment. The timecode signal is formatted to provide a system wide clock that is referenced by everything else. The signal is usually encoded directly with the video signal or is distributed via standard audio equipment. Although SMPTE timecode uses many references from video terminology, it may also be used for audio-only applications.

In many applications, a timecode source provides the signal while the rest of the devices in the system synchronize to it and follow along. The source can be a dedicated timecode generator, or it can be (and often is) a piece of the production equipment that provides timecode in addition to its primary function. An example of this is a multi-track audio tape deck that provides timecode on one track and sound for the production on other tracks. Video tape often makes similar use of a cue track or one of its audio sound tracks to record and play back timecode.

In other applications, namely video, the equipment uses timecode internally to synchronize multiple timecode sources into one. An example would be a video editor that synchronizes with timecode from a number of prerecorded scenes. As each scene is combined with the others to make the final product, their respective timecodes are synchronized with new timecode being recorded to the final product.

SMPTE timecode provides a unique address for each frame of a video signal. This address is an eight digit number, based on the 24 hour clock and the video frame rate, representing Hours, Minutes, Seconds and Frames in the following format:

HH:MM:SS:FF

The values of these fields range from 00 to 23 for HH, 00 to 59 for MM, 00 to 59 for SS, and 00 to 24 or 29 for FF (where 24 is the maximum for PAL 25 frame per second video and 29 is the maximum for NTSC $30,000/1001$ frame per second video). By convention, the first frame of a day is considered to be marked as 00:00:00:01 and the last is 00:00:00:00 (one frame past the frame marked 23:59:59:24 for PAL and 23:59:59:29 for NTSC). This format represents a nominal clock time, the nominal duration of scene or program material and makes approximate time calculations easy and direct.

The frame is the smallest unit of measure within SMPTE timecode and is a direct reference to the individual "picture" of film or video. The frame rate is the number of times per second that pictures are displayed to provide a rendition of motion. There are two standard frame rates (frames/sec) that typically use SMPTE timecode: 25 frames per second and $30,000/1001$ frames per second (approximately 29.97 frames per second). The 25 frame per second rate is based on European video, also known as SMPTE EBU (PAL/SECAM color and b&w). The $30,000/1001$ frame per second rate (sometimes loosely referred to as 30 frame per second) is based on U.S. NTSC color video broadcasting. Within the 29.97 frame per second use, there are two methods of using SMPTE timecode that are commonly used: "Non-Drop" and "Drop Frame".

A frame counter advances one count for every frame of film or video, allowing the user to time events down to $1/25$th, or $1001/30,000$th of a second.

SMPTE timecode is also sometimes used for a frame rate of exactly 30 frames per second. However, the user must take care to distinguish this use from the slightly slower $30,000/1001$ frames per second rate of U.S. NTSC color broadcast video. (The adjustment factor of $1000/1001$ originates from the method by which television signals were adjusted to provide compatibility between modern color video and the previous design for broadcast of monochrome video at 30 frames per second.)

Thus, the SMPTE timecode consists of the recording of an integer number for each of the following parameters for a video picture: Hours, Minutes, Seconds, and Frames. Each increment of the frame counter is understood to represent an increment of time of $1001/30,000$ seconds in the NTSC system and $1/25$ seconds in the PAL system.

However, since the number of frames per second in the NTSC system ($30,000/1001$) is not an integer, there is a problem of drift between the SMPTE 12M timecode representation of time and true "wall clock" time. This drift can be greatly reduced by a special frame counting method known as SMPTE "drop frame" counting. Without SMPTE drop frame counting, the drift between the SMPTE timecode's values of Hours, Minutes, and Seconds and the value measured by a true "wall clock" will accumulate more than 86 seconds of error per day. When using SMPTE drop frame counting, the drift accumulation magnitude can be reduced by about a factor of about 1,000 (although the drift is still not entirely eliminated and the remaining drift is still more than two frame sampling periods).

The SMPTE timecode has been widely used in the video production industry (for example, it is incorporated into the design of many video tape recorders). It is therefore very useful if any general media timecode design is maximally compatible with this SMPTE timecode. If such compatibility can be achieved, this will enable equipment designed for the media timecode to work well with other equipment designed specifically to use the SMPTE timecode.

Within this document, the following terminology is used. A timecode describes the data used for representing the time associated with a media sample, frame, or field. It is useful to separate the data of a timecode into two distinct types: the timebase and the timestamp. The timestamp includes the information that is used to represent the timing for a specific processing unit (a sample, frame, or field). The timebase contains the information that establishes the basis of the measurements units used in the timestamp. In other words, the timebase is the information necessary to properly interpret the timestamps. The timebase for a media stream normally remains the same for the entire sequence of samples, or at least for a very large set of samples.

For example, we may interpret the SMPTE timecode as having a timebase that consists of:

Knowledge of (or an indication of) whether the system is NTSC or PAL, and

Knowledge of (or an indication of) whether or not the system uses SMPTE "drop frame" counting in order to partially compensate for drift.

Given this, the timestamps then consist of the representations of the parameters Hours, Minutes, Seconds, and Frames for each particular video frame.

Many existing systems transmit all parameters of the timestamp with each frame. Since many of the parameters (e.g., hours and minutes) do not typically change from one frame to the next, transmitting all parameters of the timestamp with each frame results in the transmission of a significant amount of redundant data. This transmission of redundant data results in the transmission of more data than is necessary to communicate the current timing information.

The systems and methods described herein provide for the communication of timing indicators that convey timing information using a reduced amount of data.

SUMMARY

The systems and methods described herein provide for two different types of timestamps to be transmitted along with frames of data. A fill timestamp includes complete timing information, such as hour information, minute information, second information, and a frame number. A compressed timestamp includes a portion of the complete timing information, such as the frame number. When a receiving device receives a compressed timestamp, the receiving device maintains the previous values of the timing parameters that are not contained in the compressed timestamp. Since the most of the information in a full timestamp is redundant from one frame to the next, sending a significant number of compressed timestamps between full timestamps reduces the amount of data that is transmitted, but does not result in a loss of timing information.

In one embodiment, a first frame of data is encoded. A first timestamp is generated and associated with the first frame of data. The first timestamp includes complete timing information. The first frame of data and the associated first timestamp is then transmitted to a destination. A second frame of data is encoded and a second timestamp associated with the second frame of data is generated. The second timestamp includes a portion of the complete timing information. The second frame of data and the associated second timestamp is transmitted to the destination.

In another embodiment, multimedia content to be encoded is identified. The identified multimedia content is encoded into multiple frames of data. Full timestamps are generated and associated with a portion of the frames of data. Each full timestamp contains complete time information. Compressed timestamps are generated and associated with frames of data that are not associated with a full timestamp. Each compressed timestamp contains a portion of the complete time information.

In a described embodiment, the fill timestamps include hour information, minute information, second information, and a frame number.

In a particular implementation, the compressed timestamps include a frame number.

DETAILED DESCRIPTION

The systems and methods described herein utilize different types of timing indicators (referred to as timestamps) to communicate timing information along with frames of data. The use of both fill timestamps and compressed timestamps reduces the amount of timing information that must be communicated with the frames of data. A full timestamp includes all timing information and is sent occasionally (e.g., a few times each second or once every X frames of data). Between full timestamps, a series of compressed timestamps are communicated with the frames of data. The compressed timestamps contain a subset of the complete timing information contained in the full timestamps. The compressed timestamp contains the timing information that has changed since the last full timestamp was sent.

Figure 1:
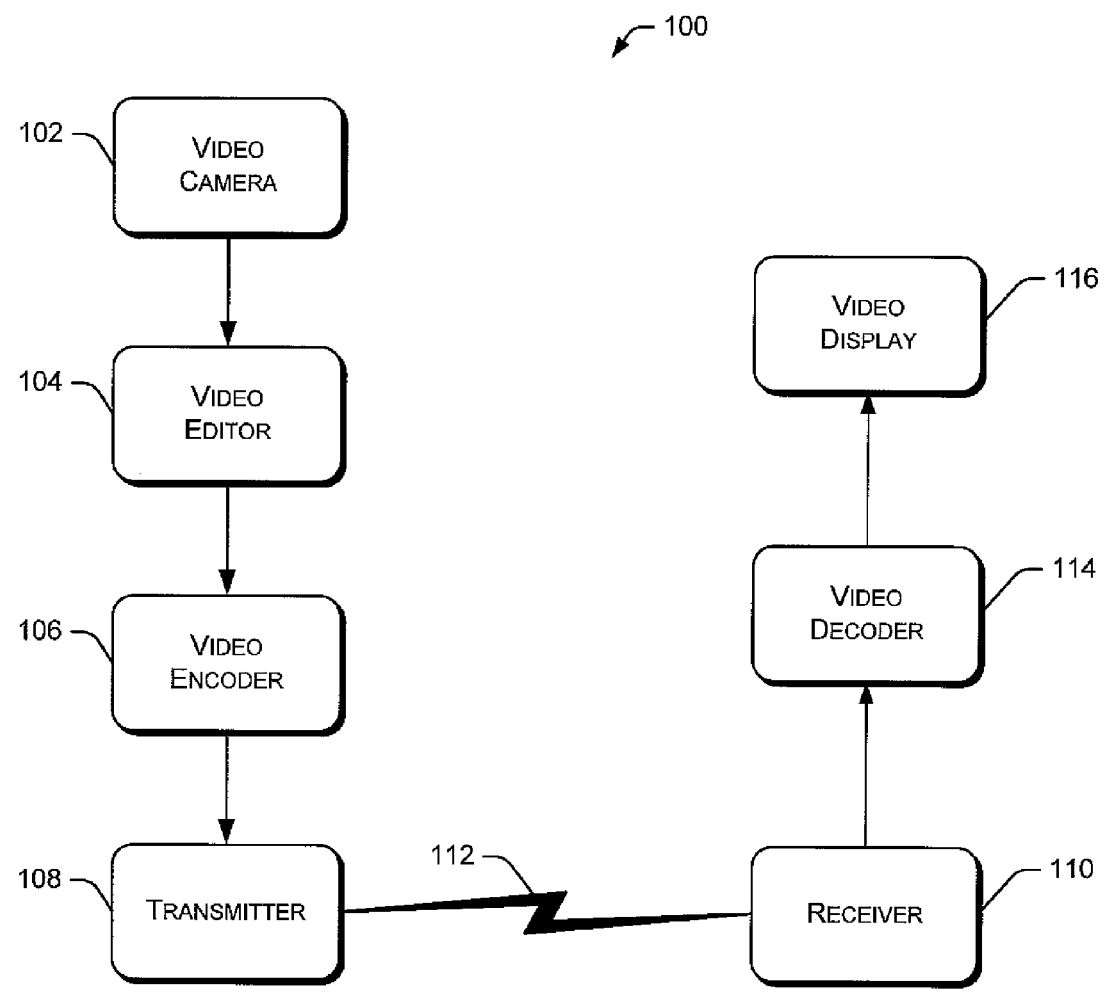
FIG. 1 illustrates a conventional system for processing and distributing video content.
Figure 2:
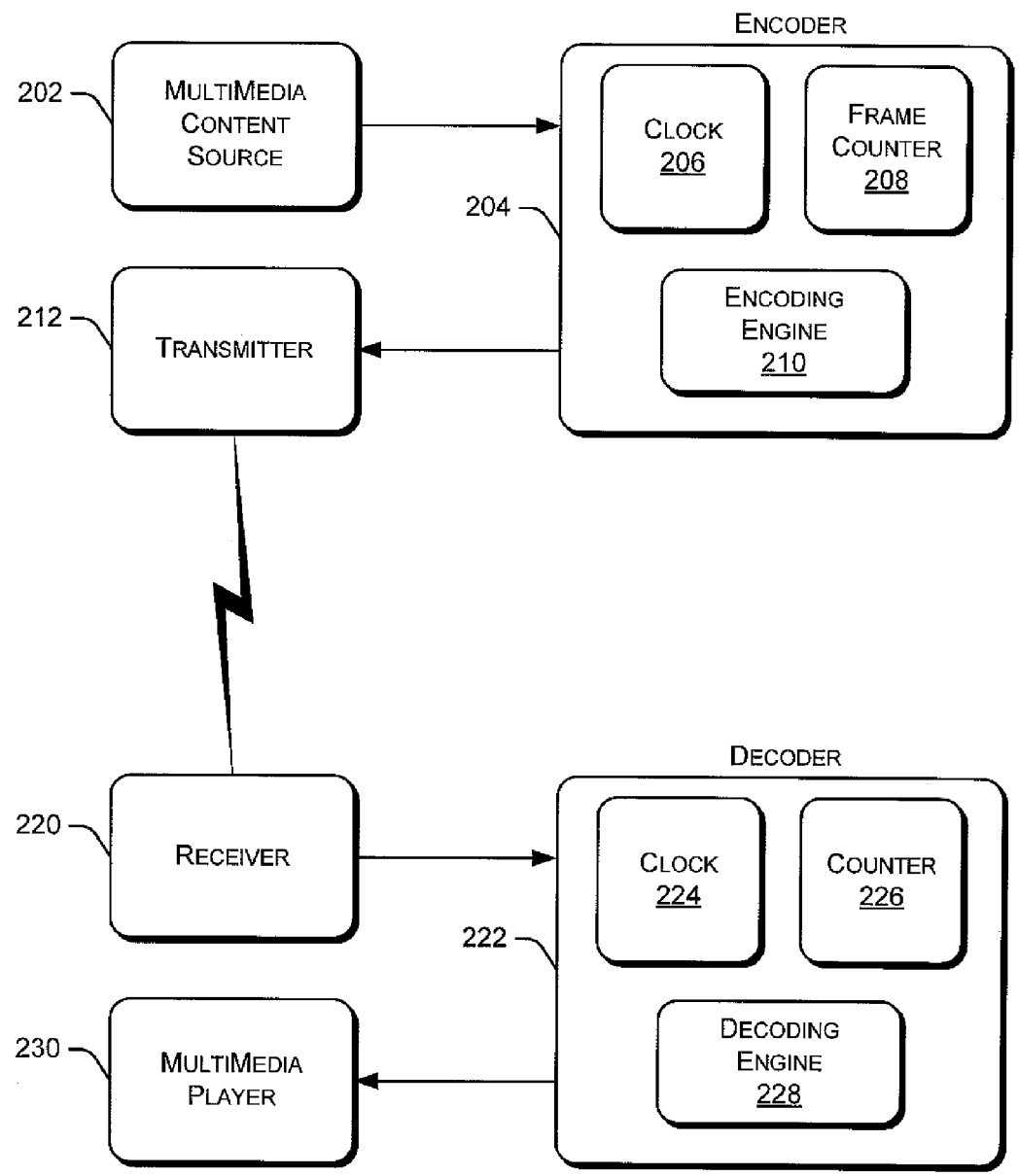
FIG. 2 illustrates an example multimedia encoding system and an example multimedia decoding system.

FIG. 2 illustrates an example multimedia encoding system and an example multimedia decoding system. A multimedia content source 202 provides multimedia content (e.g., audio content, video content, or combined audio and video content) to an encoder 204. Multimedia content source may be, for example, a video camera, microphone or other capture device, or a storage device that stores previously captured multimedia content. Encoder 204 includes a clock 206 and a frame counter 208. Clock 206 is used to determine timestamp information and synchronize operation of encoder 204. Frame counter 208 keeps track of consecutive frame numbers associated with frames of data. Encoder 204 also includes an encoding engine 210, which encodes multimedia content and other data (such as timestamp information) into multiple frames. The output of encoder 204 is communicated to a transmitter 212, which transmits the encoded content to one or more receivers. Alternatively, transmitter 212 may be a storage device that stores the encoded content (e.g., on a DVD, magnetic tape, or other storage device).

Receiver 220 receives an encoded signal including one or more frames and communicates the received signal to a decoder 222. Alternatively, receiver 220 may be a device (such as a audio player and/or a video player) capable of reading stored encoded content (e.g., stored on a DVD or other storage device). Decoder 222 includes a clock 224 and a counter 226. Clock 224 aids in synchronizing decoder 222. Counter 226 is used to assign frame identifiers to received frames of data. Decoder 222 also includes a decoding engine 228 which decodes the received signal. After decoding the received signal, decoder 222 communicates the decoded content to a multimedia player 230 which renders the multimedia content defined by the decoded signal. Multimedia player may be an audio player (e.g., a CD player), a video player (e.g., a DVD player), or a combination audio player and video player. Decoder 222 may be a separate device or may be incorporated into another device, such as a television or a DVD player.

Figure 3:
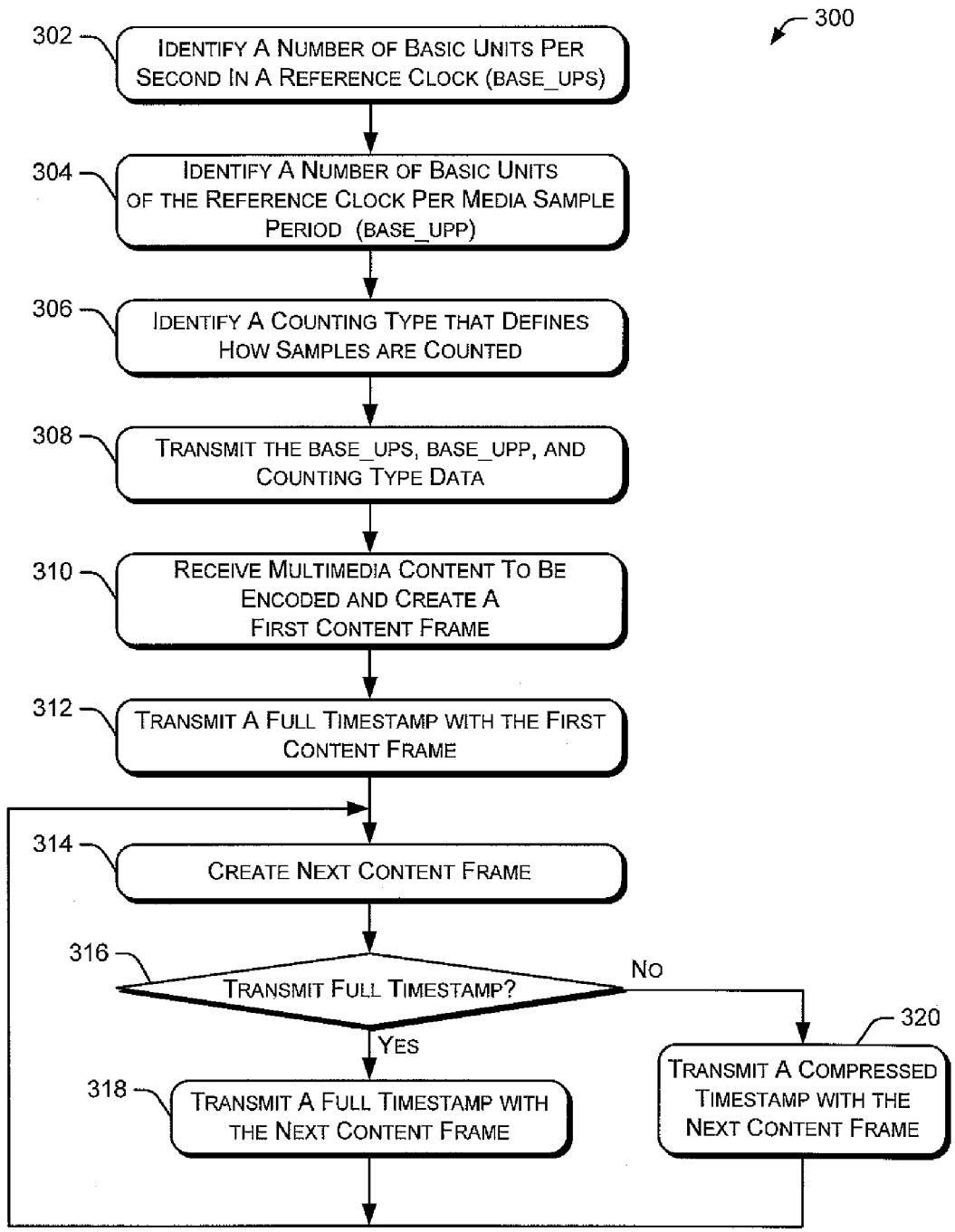
FIG. 3 is a flow diagram illustrating a procedure for encoding multimedia content and transmitting timestamps and associated multimedia content frames.

FIG. 3 is a flow diagram illustrating a procedure 300 for encoding multimedia content and transmitting timestamps and associated multimedia content frames. Initially, procedure 300 identifies a number of basic units per second in a reference clock (block 302), which is represented by a parameter labeled "base_ups". In a particular example, the reference clock has 30,000 basic units per second (also referred to as 30,000 hertz). The procedure then identifies a number of basic units of the reference clock per media sample period (block 304), which is represented by a parameter labeled "base_upp". In a particular example, each increment of a counter (such as a frame counter) occurs after 1001 increments of the reference clock. In this example, if the counter advances by five, the reference clock advances by 5005. This example reduces the amount of data that needs to be communicated regarding the clock (i.e., sending "5" instead of "5005").

The procedure 300 then identifies a counting type that defines the manner in which samples (or frames) are counted (block 306). Additional details regarding the various counting types are provided below. At block 308, the base_ups, base_upp, and counting type data is transmitted to one or more receivers. These data values allow each receiver to understand and properly decode subsequent frames of data.

Next, the procedure receives multimedia content to be encoded and creates a first content frame (block 310). The first content frame is created by encoding a portion of the received multimedia content. The procedure then transmits a full timestamp along with the first content frame (block 312). The full timestamp may be embedded within the first content frame or transmitted separately, but along with the full timestamp. The full timestamp includes the hour, minutes, seconds, and frame number associated with the first content frame.

The procedure then creates the next content frame by encoding the next portion of the received multimedia content (block 314). At block 316, the procedure determines whether to transmit a full timestamp or a compressed timestamp. As mentioned above, a full timestamp includes all time-related information (i.e., the hour, minute, second, and frame number associated with the first content frame). The compressed timestamp includes a subset of the information required for a full timestamp. In a particular implementation, the compressed timestamp contains the information that has changed since the last timestamp (either full or compressed) was transmitted to the receivers. Typically, the compressed timestamp includes the frame number associated with the current content frame being transmitted. The compressed timestamp reduces the amount of data that must be transmitted when compared with the full timestamp. In a particular implementation, the full timestamp is sent several times each second. In an alternate implementation, the full timestamp is sent every X frames, where X is approximately 15.

In another implementation, the decision of whether to send a full timestamp or compressed timestamp is adjusted dynamically based on an estimate of the reliability of the communication link between transmitter and receiver. If the estimated reliability of the communication link is high, then full timestamps may be sent less frequently. However, if the communication link is not expected to be reliable, the full timestamps are sent more frequently.

If the procedure determines that a full timestamp should be transmitted, a full timestamp is transmitted along with the next content frame (block 318). Otherwise, a compressed timestamp is transmitted along with the next content frame (block 320). The procedure continues by returning to block 314 to create the next content frame and determine whether a full timestamp or a compressed timestamp is to be transmitted along with the next content frame.

In a particular embodiment, the data that specifies the timebase and the starting timestamp of a sequence of data samples (or frames) is sent using the following pseudo-code:

```
send (base_ups)                         // unsigned integer
send (base_upp)                         // unsigned integer
send (counting_type)                    // defined in Table 1
send (fall_timestamp_sequence_flag)     // boolean
send (discontinuity_flag)               // boolean
send (count_dropped)                    // boolean
send (frames_value)                     // integer
if(counting_type != '000')
    send (offset_value)                 // integer
send (seconds_value)                    // integer
send (minutes_value)                    // integer
send (hours_value)                      // integer
```

These data specify the time of the first sample of a sequence of frames and specify the timebase necessary for interpretation of the parameters of each individual timestamp. Since these data specify both the timebase and the initial timestamp for an entire sequence of frames, they are referred to herein as the sequence header information for this particular embodiment. In one embodiment, a full timestamp is included in each sequence header. Alternatively, the sequence headers may not contain a full timestamp. Instead, the data contained in a full timestamp is retrieved from the full timestamp associated with the first frame of data following the sequence header.

The base_ups, base_upp, and counting type parameters are discussed above. Table 1 below defines the various counting_type values.

TABLE 1

| Value | Meaning |
|---|---|
| 000 | No dropping of frames_value count values and no use of offset_value |
| 001 | No dropping of frames_value count values |
| 010 | Dropping of individual zero values of frames_value count |
| 011 | Dropping of individual max_pps values of frames_value count |
| 100 | Dropping of the two lowest (values 0 and 1) frames_value counts when seconds_value is zero and minutes_value |

TABLE 1-continued

| Value | Meaning |
|---|---|
|  | is not an integer multiple of ten |
| 101 | Dropping of unspecified individual frames_value count values |
| 110 | Dropping of unspecified numbers of unspecified frames_value count values |
| 111 | Reserved |

Particular parameters are defined as follows:

full_timestamp_sequence_flag: Indicates whether every timestamp in the following sequence of timestamps shall be fully specified or whether some timestamps (referred to as compressed timestamps) may only contain partial information (depending on memory of values sent previously in the sequence header or in a frame timestamp). If full_timestamp_sequence flag is "1", then full_timestamp_flag must be "1" in the timestamp information for every frame in the following sequence.

discontinuity_flag: Indicates whether the time difference that can be calculated between the starting time of the sequence and the time indicated for the last previous transmitted frame can be interpreted as a true time difference. Shall be "1" if no previous frame has been transmitted.

count_dropped: Indicates, if discontinuity_flag is "0", whether some value of frames_value was skipped after the last previous transmitted frame to reduce drift between the time passage indicated in the seconds_value, minutes_value, and hours_value parameters and those of a true clock.

frames_value, offset_value, seconds_value, minutes_value, and hours_value: Indicate the parameters to be used in calculating an equivalent timestamp for the first frame in the sequence. Shall be equal to the corresponding values of these parameters in the header of the first frame after the sequence header, if present in the sequence header.

In this embodiment, an extra signed-integer parameter called offset_value is used in addition to the unsigned integer frames_value, seconds_value, minutes_value, and hours_value parameters that are used by the SMPTE timecode's timestamp, in order to relate the time of a sample precisely relative to true time, as shown in a formula below.

In a particular embodiment, the timestamp structure sending process for the timestamps on individual media samples (or frames) is implemented using the following pseudo-code:

```
send (full_timestamp_flag)           // boolean
send (frames_value)                  // unsigned integer
if(counting_type != '000') {
    if(full_timestamp_flag)
        send (offset_value)          // signed integer
    else {
        send (offset_value_flag)     // boolean
        if(offset_value_flag)
            send (offset_value)      // signed integer
    }
    if(counting_type != '001')
        send (count_dropped_flag)    // boolean
}
if(full_timestamp_flag) {
    send (seconds_value)             // unsigned integer 0..59
    send (minutes_value)             // unsigned integer 0..59
    send (hours_value)               // unsigned integer
```

```
} else {
    send (seconds_flag)                // boolean
    if(seconds_flag) {
        send (seconds_value)           // unsigned integer 0..59
        send (minutes_flag)            // boolean
        if(minutes_flag) {
            send (minutes_value)       // unsigned integer 0..59
            send (hours_flag)          // boolean
            if(hours_flag)
                send (hours_value)     // unsigned integer
        }
    }
}
```

If any timestamp is incomplete (i.e., full_timestamp_flag is zero and at least one of seconds_flag, minutes_flag, hours_flag, and offset_value_flag is present and zero) the last prior sent value for each missing parameter is used. An equivalent time specifying the time of a media sample (in units of seconds) may be computed as follows:

$$\text{equivalent\_time} = 60 \times (60 \times \text{hours\_value} + \text{minutes\_value}) + \text{seconds\_value} + (\text{base\_upp} \times \text{frames\_value} + \text{offset\_value})/\text{base\_ups}$$

Using the timebase parameters, a derived parameter is defined as:

$$\text{max\_pps} = \text{ceil}\,(\text{base\_ups}/\text{base\_upp})$$

where ceil (x) is defined as the function of an argument x, which, for non-negative values of x, is equal to x if x is an integer and is otherwise equal to the smallest integer greater than x. The value of frames_value should not exceed max_pps.

If count_dropped_flag is '1', then:
if counting_type is '010', frames_value shall be '1' and the value of frames_value for the last previous transmitted frame shall not be equal to '0' unless a sequence header is present between the two frames with discontinuity_flag equal to '1'.
if counting_type is '011', frames_value shall be '0' and the value of frames_value for the last previous transmitted frame shall not be equal to max_pps unless a sequence header is present between the two frames with discontinuity_flag equal to '1'.
if counting_type is '100', frames_value shall be '2' and the seconds_value shall be zero and minutes_value shall not be an integer multiple of ten and frames_value for the last previous transmitted frame shall not be equal to '0' or '1' unless a sequence header is present between the two frames with discontinuity_flag equal to '1'.
if counting_type is '101' or '110', frames_value shall not be equal to one plus the value of frames_value for the last previous transmitted frame modulo max_pps unless a sequence header is present between the two frame with discontinuity_flag equal to '1'.

As the degree of precision for the various parameters of each media sample timestamp becomes coarser, the inclusion of the further information needed to place the timestamp within the more global scale is optional. Any coarse-level context information that is not sent is implied to have the same value as the last transmitted parameter of the same type. The finely-detailed information necessary to locate the precise sample time relative to that of neighboring samples is included with every timestamp, but as the degree of coarseness of the time specification becomes higher, the inclusion of further more coarse context information is optional in order to reduce the average amount of information that is required to be communicated.

Figure 4:
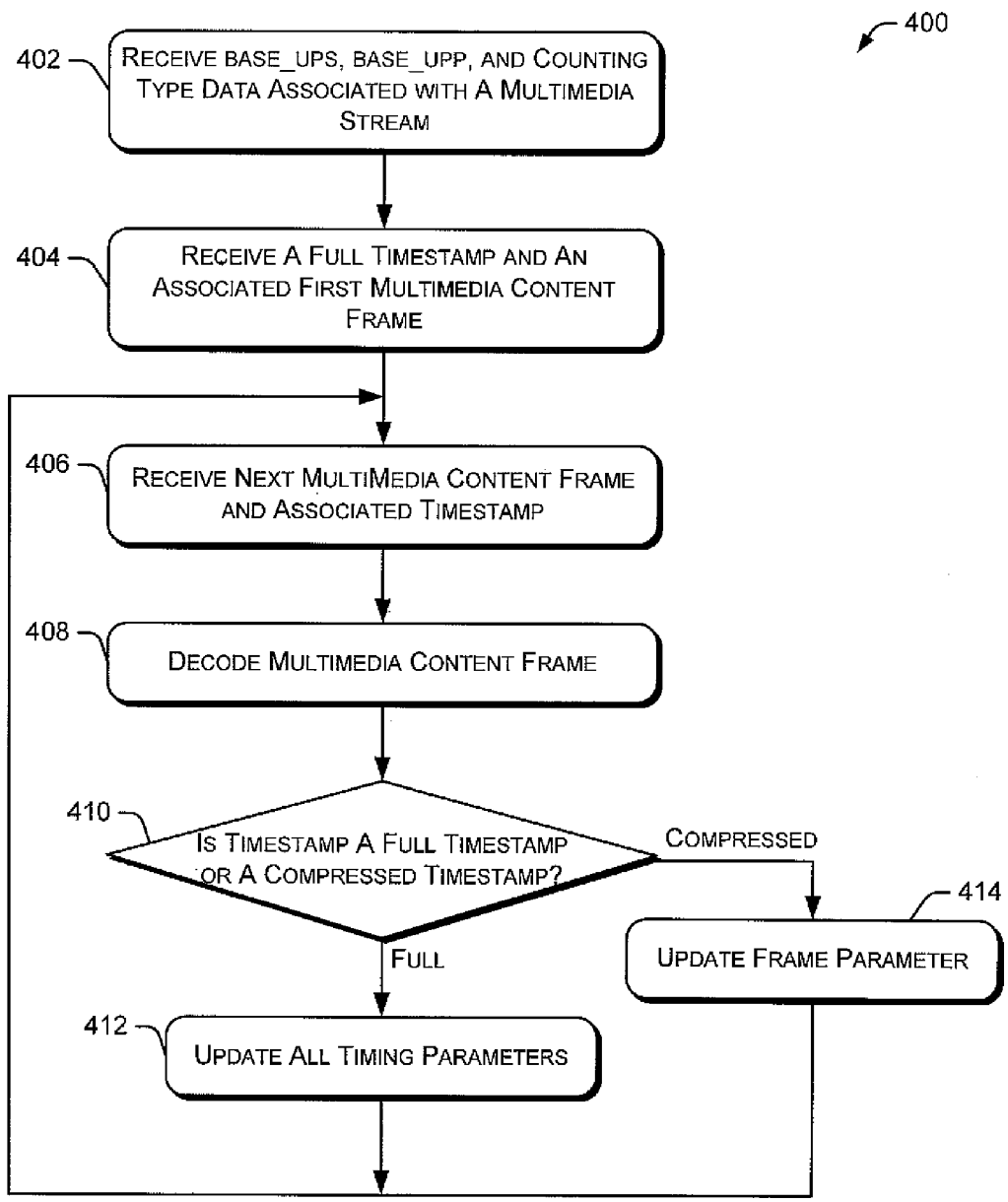
FIG. 4 is a flow diagram illustrating a procedure for decoding multimedia content that includes multiple time stamps and associated content frames.

FIG. 4 is a flow diagram illustrating a procedure 400 for decoding multimedia content that includes multiple time stamps and associated content frames. At block 402, the procedure receives base_ups, base_upp, and counting type data associated with a multimedia stream from a transmitting device. This information allows the receiving system to properly interpret and decode the subsequently received content. Next, a full timestamp and an associated first multimedia content frame are received (block 404). The full timestamp provides the hours, minutes, seconds, and frame number associated with the first received frame, and, in a particular embodiment, a time offset number allowing a drift-free precise relation to be determined between the time computed from the other parameters and the true time of the sample.

The procedure 400 then receives a next multimedia content frame and an associated timestamp. An associated flag (full_timestamp_flag) will indicate whether the timestamp is a full timestamp or a compressed timestamp. The procedure decodes the multimedia content frame (block 408) and determines (based on the full_timestamp_flag) whether the timestamp is a full timestamp or a compressed timestamp (block 410). If the timestamp is a full timestamp, the procedure updates all timing parameters provided by the full timestamp (block 412). If the timestamp is a compressed timestamp, the procedure updates the frame parameter (block 414). The system uses the values from the most recent full timestamp for all other timing parameter values. Alternatively, if a compressed timestamp is received, the procedure updates all timing parameters contained in the compressed timestamp.

After updating one or more timing parameters, the procedure returns to block 406 to receive and process the next multimedia content frame and associated timestamp.

Figure 5:
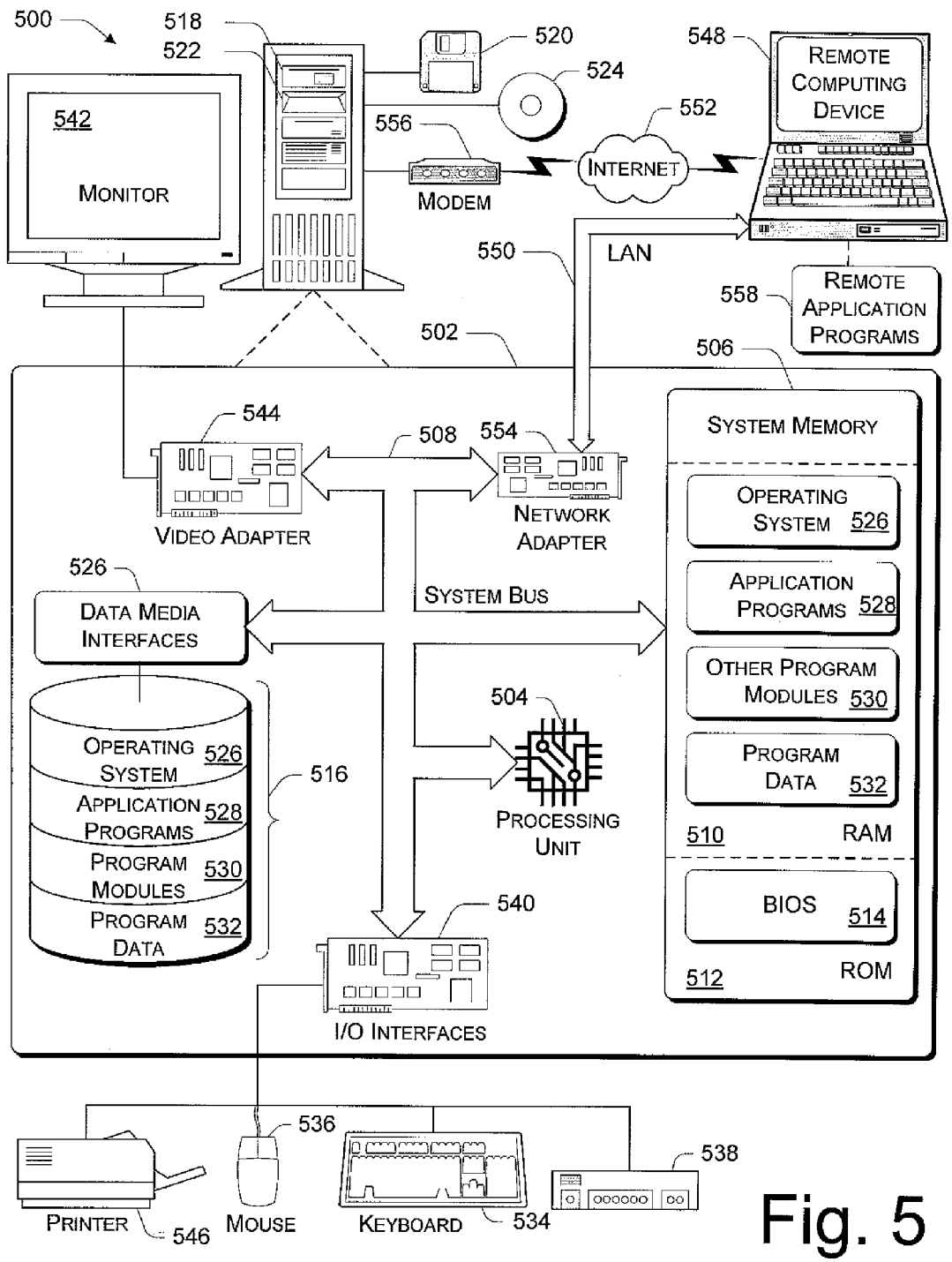
FIG. 5 illustrates an example of a suitable operating environment in which the systems and methods described herein may be implemented.

FIG. 5 illustrates an example of a suitable computing environment 500 within which the video encoding and decoding procedures may be implemented (either fully or partially). The computing environment 500 may be utilized in the computer and network architectures described herein.

The exemplary computing environment 500 is only one example of a computing environment and is not intended to suggest any limitation as to the scope of use or functionality of the computer and network architectures. Neither should the computing environment 500 be interpreted as having any dependency or requirement relating to any one or combination of components illustrated in the exemplary computing environment 500.

The video encoding and decoding systems and methods described herein may be implemented with numerous other general purpose or special purpose computing system environments or configurations. Examples of well known computing systems, environments, and/or configurations that may be suitable for use include, but are not limited to, personal computers, server computers, multiprocessor systems, microprocessor-based systems, network PCs, minicomputers, mainframe computers, distributed computing environments that include any of the above systems or devices, and so on. Compact or subset versions may also be implemented in clients of limited resources.

The computing environment 500 includes a general-purpose computing device in the form of a computer 502. The components of computer 502 can include, by are not limited to, one or more processors or processing units 504, a system memory 506, and a system bus 508 that couples various system components including the processor 504 to the system memory 506.

The system bus 508 represents one or more of several possible types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 502 typically includes a variety of computer readable media. Such media can be any available media that is accessible by computer 502 and includes both volatile and non-volatile media, removable and non-removable media.

The system memory 506 includes computer readable media in the form of volatile memory, such as random access memory (RAM) 510, and/or non-volatile memory, such as read only memory (ROM) 512. A basic input/output system (BIOS) 514, containing the basic routines that help to transfer information between elements within computer 502, such as during start-up, is stored in ROM 512. RAM 510 typically contains data and/or program modules that are immediately accessible to and/or presently operated on by the processing unit 504.

Computer 502 may also include other removable/non-removable, volatile/non-volatile computer storage media. By way of example, FIG. 5 illustrates a hard disk drive 516 for reading from and writing to a non-removable, non-volatile magnetic media (not shown), a magnetic disk drive 518 for reading from and writing to a removable, non-volatile magnetic disk 520 (e.g., a "floppy disk"), and an optical disk drive 522 for reading from and/or writing to a removable, non-volatile optical disk 524 such as a CD-ROM, DVD-ROM, or other optical media. The hard disk drive 516, magnetic disk drive 518, and optical disk drive 522 are each connected to the system bus 508 by one or more data media interfaces 526. Alternatively, the hard disk drive 516, magnetic disk drive 518, and optical disk drive 522 can be connected to the system bus 508 by one or more interfaces (not shown).

The disk drives and their associated computer-readable media provide non-volatile storage of computer readable instructions, data structures, program modules, and other data for computer 502. Although the example illustrates a hard disk 516, a removable magnetic disk 520, and a removable optical disk 524, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 516, magnetic disk 520, optical disk 524, ROM 512, and/or RAM 510, including by way of example, an operating system 526, one or more application programs 528, other program modules 530, and program data 532. Each of the operating system 526, one or more application programs 528, other program modules 530, and program data 932 (or some combination thereof) may include elements of the video encoding and/or decoding algorithms and systems.

A user can enter commands and information into computer 502 via input devices such as a keyboard 534 and a pointing device 536 (e.g., a "mouse"). Other input devices 538 (not shown specifically) may include a microphone, joystick, game pad, satellite dish, serial port, scanner, and/or the like. These and other input devices are connected to the processing unit 504 via input/output interfaces 540 that are coupled to the system bus 508, but may be connected by other interface and bus structures, such as a parallel port, game port, or a universal serial bus (USB).

A monitor 542 or other type of display device can also be connected to the system bus 508 via an interface, such as a video adapter 544. In addition to the monitor 542, other output peripheral devices can include components such as speakers (not shown) and a printer 546 which can be connected to computer 502 via the input/output interfaces 540.

Computer 502 can operate in a networked environment using logical connections to one or more remote computers, such as a remote computing device 548. By way of example, the remote computing device 548 can be a personal computer, portable computer, a server, a router, a network computer, a peer device or other common network node, and so on. The remote computing device 548 is illustrated as a portable computer that can include many or all of the elements and features described herein relative to computer 502.

Logical connections between computer 502 and the remote computer 548 are depicted as a local area network (LAN) 550 and a general wide area network (WAN) 552. Such networking environments are commonplace in offices, enterprise-wide computer networks, intranets, and the Internet.

When implemented in a LAN networking environment, the computer 502 is connected to a local network 550 via a network interface or adapter 554. When implemented in a WAN networking environment, the computer 502 typically includes a modem 556 or other means for establishing communications over the wide network 552. The modem 556, which can be internal or external to computer 502, can be connected to the system bus 508 via the input/output interfaces 540 or other appropriate mechanisms. It is to be appreciated that the illustrated network connections are exemplary and that other means of establishing communication link(s) between the computers 502 and 548 can be employed.

In a networked environment, such as that illustrated with computing environment 500, program modules depicted relative to the computer 502, or portions thereof, may be stored in a remote memory storage device. By way of example, remote application programs 558 reside on a memory device of remote computer 548. For purposes of illustration, application programs and other executable program components such as the operating system are illustrated herein as discrete blocks, although it is recognized that such programs and components reside at various times in different storage components of the computing device 502, and are executed by the data processor(s) of the computer.

An implementation of the system and methods described herein may result in the storage or transmission of data, instructions, or other information across some form of computer readable media. Computer readable media can be any available media that can be accessed by a computer. By way of example, and not limitation, computer readable media may comprise "computer storage media" and "communications media." "Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Alternatively, portions of the systems and methods described herein may be implemented in hardware or a combination of hardware, software, and/or firmware. For example, one or more application specific integrated circuits (ASICs) or programmable logic devices (PLDs) could be designed or programmed to implement one or more portions of the video encoding or video decoding systems and procedures.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. In a computing device that implements a video encoder, a method comprising:
   with the computing device that implements the video encoder, encoding a first frame;
   with the computing device that implements the video encoder, generating a first timestamp associated with the first frame;
   with the computing device that implements the video encoder, outputting encoded data for the first frame and data for the associated first timestamp, including:
      outputting a first full timestamp flag that indicates whether the first timestamp is a full timestamp;
      if the first full timestamp flag indicates the first timestamp is a full timestamp, outputting a parameter value for each of a plurality of timing parameters; and
      otherwise, outputting one or more timing parameter flags for the first timestamp and a parameter value for each of the plurality of timing parameters that is indicated to be present by a corresponding one of the one or more timing parameter flags for the first timestamp, wherein use of the one or more timing parameter flags for the first timestamp permits output of parameter values for less than all of the plurality of timing parameters as the data for the first timestamp;
   with the computing device that implements the video encoder, encoding a second frame;
   with the computing device that implements the video encoder, generating a second timestamp associated with the second frame; and
   with the computing device that implements the video encoder, outputting encoded data for the second frame and data for the associated second timestamp, including:
      outputting a second full timestamp flag that indicates whether the second timestamp is a full timestamp;
      if the second full timestamp flag indicates the second timestamp is a full timestamp, outputting a parameter value for each of the plurality of timing parameters; and
      otherwise, outputting one or more timing parameter flags for the second timestamp and a parameter value for each of the plurality of timing parameters that is indicated to be present by a corresponding one of the one or more timing parameter flags for the second timestamp, wherein use of the one or more timing parameter flags for the second timestamp permits output of parameter values for less than all of the plurality of timing parameters as the data for the second timestamp.

2. A method as recited in claim 1 further comprising:
   with the computing device that implements the video encoder, encoding a third frame;
   with the computing device that implements the video encoder, generating a third timestamp associated with the third frame; and
   with the computing device that implements the video encoder, outputting encoded data for the third frame and data for the associated third timestamp, including:
      outputting a third full timestamp flag that indicates whether the third timestamp is a full timestamp;
      if the third full timestamp flag indicates the third timestamp is a full timestamp, outputting a parameter value for each of the plurality of timing parameters; and
      otherwise, outputting one or more timing parameter flags for the third timestamp and a parameter value for each of the plurality of timing parameters that is indicated to be present by a corresponding one of the one or more timing parameter flags for the third timestamp, wherein use of the one or more timing parameter flags for the third timestamp permits output of parameter values for less than all of the plurality of timing parameters as the data for the third timestamp.

3. A method as recited in claim 1 further comprising:
   with the computing device that implements the video encoder, identifying timing information related to the first and second frames; and
   with the computing device that implements the video encoder, outputting the timing information.

4. A method as recited in claim 1 wherein the first timestamp is a full timestamp, and wherein the output parameter values that are output by the computing device for the first timestamp indicate hour information, minute information, and second information.

5. A method as recited in claim 1 wherein the first timestamp includes an offset value that is used to relate the time associated with the first frame to true time.

6. A method as recited in claim 1 wherein the second timestamp is not a full timestamp, and wherein the parameter values that are output by the computing device for the second timestamp indicate seconds information but not minutes information or hours information.

7. A method as recited in claim 1 further comprising:
   with the computing device that implements the video encoder, encoding a plurality of frames; and
   with the computing device that implements the video encoder, generating additional timestamps associated with the plurality of frames, respectively.

8. In a computing device that implements a video decoder, a method comprising:

receiving, at the computing device that implements the video decoder, encoded data for a first frame;
receiving, at the computing device that implements the video decoder, data for a first timestamp associated with the first frame, including:
  receiving a first full timestamp flag that indicates whether the first timestamp is a full timestamp;
  if the first full timestamp flag indicates the first timestamp is a full timestamp, receiving a parameter value for each of a plurality of timing parameters; and
  otherwise, receiving one or more timing parameter flags for the first timestamp and a parameter value for each of the plurality of timing parameters that is indicated to be present by a corresponding one of the one or more timing parameter flags for the first timestamp, wherein use of the one or more timing parameter flags for the first timestamp permits receipt of parameter values for less than all of the plurality of timing parameters as the data for the first timestamp;
with the computing device that implements the video decoder, decoding the first frame using the encoded data for the first frame;
receiving, at the computing device that implements the video decoder, encoded data for a second frame;
receiving, at the computing device that implements the video decoder, data for a second timestamp associated with the second frame, including:
  receiving a second full timestamp flag that indicates whether the second timestamp is a full timestamp;
  if the second full timestamp flag indicates the second timestamp is a full timestamp, receiving a parameter value for each of the plurality of timing parameters; and
  otherwise, receiving one or more timing parameter flags for the second timestamp and a parameter value for each of the plurality of timing parameters that is indicated to be present by a corresponding one of the one or more timing parameter flags for the second timestamp, wherein use of the one or more timing parameter flags for the second timestamp permits receipt of parameter values for less than all of the plurality of timing parameters as the data for the second timestamp; and
with the computing device that implements the video decoder, decoding the second frame using the encoded data for the second frame.

9. A method as recited in claim 8 further comprising:
receiving, at the computing device that implements the video decoder, encoded data for a third frame;
receiving, at the computing device that implements the video decoder, data for a third timestamp associated with the third frame, including:
  receiving a third full timestamp flag that indicates whether the third timestamp is a full timestamp;
  if the third full timestamp flag indicates the third timestamp is a full timestamp, receiving a parameter value for each of the plurality of timing parameters; and
  otherwise, receiving one or more timing parameter flags for the third timestamp and a parameter value for each of the plurality of timing parameters that is indicated to be present by a corresponding one of the one or more timing parameter flags for the third timestamp, wherein use of the one or more timing parameter flags for the third timestamp permits receipt of parameter values for less than all of the plurality of timing parameters as the data for the third timestamp; and
with the computing device that implements the video decoder, decoding the third frame using the encoded data for the third frame.

10. A method as recited in claim 8 further comprising receiving timing information related to the manner in which frames are transmitted from a data source.

11. A method as recited in claim 8 further comprising updating all of the plurality of timing parameters with the parameter values received at the computing device for the first timestamp.

12. A method as recited in claim 8 further comprising updating at least one of the plurality of timing parameters with each parameter value received at the computing device for the second timestamp.

13. One or more computer-readable media having stored thereon a computer program that, when executed by one or more processors, causes the one or more processors to:
  encode a first frame;
  generate a first timestamp associated with the first frame;
  encode a plurality of subsequent frames;
  generate a plurality of subsequent timestamps;
  output encoded data for the first frame, the plurality of subsequent frames, the first timestamp and the plurality of subsequent timestamps, including, for each of the first timestamp and the plurality of subsequent timestamps:
    output a full timestamp flag that indicates whether the timestamp is a full timestamp;
    if the full timestamp flag indicates the timestamp is a full timestamp, output a parameter value for each of a plurality of timing parameters; and
    otherwise, output one or more timing parameter flags for the timestamp and a parameter value for each of the plurality of timing parameters that is indicated to be present by a corresponding one of the one or more timing parameter flags for the timestamp, wherein use of the one or more timing parameter flags for the timestamp permits output of parameter values for less than all of the plurality of timing parameters as the data for the timestamp.

14. One or more computer-readable media as recited in claim 13 wherein, when the timestamp is a full timestamp, the parameters values that are output for the plurality of timing parameters indicate hour information, minute information, second information, and a frame number.

15. One or more computer-readable media as recited in claim 13 wherein each of the subsequent timestamps includes a frame number.

16. An apparatus comprising:
  an encoded multimedia content source; and
  a decoder coupled to receive encoded multimedia content from the encoded multimedia content source;
  wherein the encoded multimedia content includes a first frame having an associated first timestamp,
  wherein the encoded multimedia content includes a second frame having an associated second timestamp, and
  wherein, for each of the first and second timestamps:
    a full timestamp flag indicates whether the timestamp is a full timestamp;
    if the full timestamp flag indicates the timestamp is a full timestamp, the encoded multimedia content includes a parameter value for each of a plurality of timing parameters; and
    otherwise, the encoded multimedia content includes one or more timing parameter flags for the timestamp and a parameter value for each of the plurality of timing parameters that is indicated to be present by a corresponding one of the one or more timing parameter flags for the timestamp, wherein use of the one or more timing parameter flags for the timestamp permits sending of parameter values for less than all of the plurality of timing parameters as data sent for the timestamp.

17. An apparatus as recited in claim 16 wherein the decoder is configured to decode the first frame and the second frame.

* * * * *

UNITED STATES PATENT AND TRADEMARK OFFICE
CERTIFICATE OF CORRECTION

PATENT NO.       : 7,633,551 B2                                                    Page 1 of 1
APPLICATION NO. : 11/379025
DATED            : December 15, 2009
INVENTOR(S)      : Gary J. Sullivan It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 804 days.

Signed and Sealed this

Ninth Day of November, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,633,551 B2 | Page 1 of 1 |
| APPLICATION NO. | : 11/379025 | |
| DATED | : December 15, 2009 | |
| INVENTOR(S) | : Gary J. Sullivan | |

It is certified that error appears in the above-identified patent and that said Letters Patent is hereby corrected as shown below:

In column 16, line 48, in Claim 4, after "the" delete "output".

Signed and Sealed this
Fifteenth Day of February, 2011

David J. Kappos
*Director of the United States Patent and Trademark Office*